United States Patent [19]

Kouno

[11] Patent Number: 5,080,925

[45] Date of Patent: Jan. 14, 1992

[54] METHOOD OF GEL-COATING SEED AND APPARATUS USED THEREFOR

[75] Inventor: Yasushi Kouno, Susono, Japan

[73] Assignee: Yazaki Corporation, Tokyo, Japan

[21] Appl. No.: 429,597

[22] Filed: Oct. 31, 1989

[30] Foreign Application Priority Data

Nov. 8, 1988 [JP] Japan ................................. 63-280511

[51] Int. Cl.$^5$ ........................... B05D 7/00; A01N 3/00
[52] U.S. Cl. ........................................... 427/4; 264/5; 264/7; 427/212
[58] Field of Search ................... 427/4, 212; 264/7, 5

[56] References Cited

U.S. PATENT DOCUMENTS 4,238,523 12/1980 Porter ...................................... 427/4
4,806,357 2/1989 Garrett et al. ........................... 427/4

FOREIGN PATENT DOCUMENTS 59-146504 9/1984 Japan .
60-95811 6/1985 Japan .

Primary Examiner—Janyce Bell
Attorney, Agent, or Firm—Armstrong, Nikaido, Marmelstien, Kubovcik & Murray

[57] ABSTRACT

A method of gel-coating a seed comprises opening and closing a gel flow channel in a nozzle main body containing a gel therewithin by a cutting plunger, forming a gel-coating layer by opening a valve, supplying a seed contained in a seed storing vessel through the inside of said cutting plunger to the gel-coating layer thereby gel-coating the seed, and then falling the gel-coated seed into a curing vessel by closing the valve. A gel-coating apparatus included a seed supply portion comprising a rotational drum having a small aperture for attracting a speed by vacuum created inside which is broken at a predetermined rotational position by an aperture closing member and a gel-coating portion having a cylindrical cutting plunger disposed at the inside of a nozzle main body for opening and closing a gel flow channel and means for the supplying the gel into the gel flow channel.

4 Claims, 11 Drawing Sheets

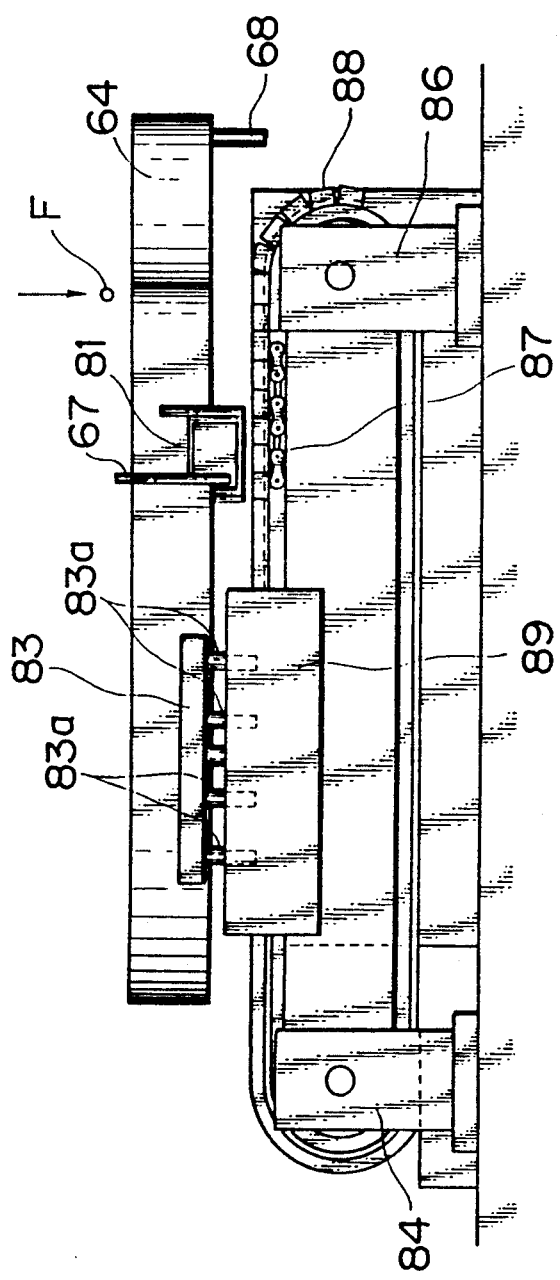
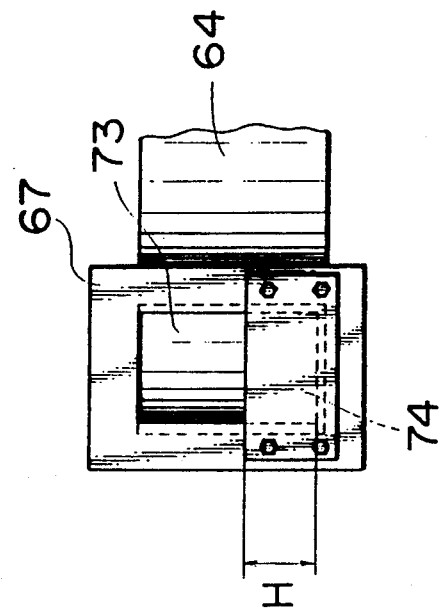

METHOD OF GEL-COATING SEED AND APPARATUS USED THEREFOR

BACKGROUND OF THE INVENTION

1. Field of the Invention

The present invention concerns a method of gel-coating seed and an apparatus used therefor. More specifically, it relates to a method of coating a seed efficiently and continuously with a gel layer containing nutrients, sterilizers or like other chemicals, and having elastic property, in which only the surface layer of the gel is cured for protecting the seed and the seed is sphericalized and enlarged for improving the germination rate and facilitating seeding. The invention also relates to an apparatus used for practicing such a method.

2. Description of the Prior Art

There are various size and shape of seeds and those seeds of minute size or irregular shape can not be handled with seeders.

As a countermeasure, there have been developed coated seeds in which the periphery of a seed is protected with a coating material containing nutrients, sterilizers, etc. and the seed is sphericalized and enlarged for easy seeding.

In the conventional seed-coating, nutrient, sterilizers or like other chemicals are dressed to the periphery of a seed, or the periphery of a seed is coated with coating material such as clay or sugar incorporated with chemical to form a relatively hard coating layer.

The apparatus used for the seed coating is substantially in common with both of the methods.

That is, the apparatus generally comprises a spraying device for spraying a diluted aqueous solution of CMC (carboxymethyl cellulose) or gelatin as a binder to the surface of a seed and a coating pan for forming a coating layer around the seed while rolling the coated seed.

Accordingly, the coating procedure is separated into two steps in such an apparatus and continuous coating operation cannot be conducted.

There has been also developed an apparatus for conducting the seed coating operation by one step.

For instance, an apparatus using a rotary drum, instead of the coating pan, for applying or coating has also been put to practical use as described in Japanese Utility Model Laid-Open Sho 59-146504 and 60-95811. However, although the apparatus can deal with a great amount of seeds, it creates a problem in that the apparatus cannot cope with the difference of the natures of seeds that vary depending on the kinds of plants. In addition, an external force exceeding an allowable level is exerted on the seed in view of the structure.

The prior art described above has the following problems.

(a) Dressing at the periphery of seeds varies greatly with respect to the shape and the thickness.

(b) Appropriate control for the thickness of the coating is extremely difficult and scattering of thickness may sometime lead to failure of germination.

(c) Since external force is applied to seeds in a mass-coating apparatus, it causes troubles such as injury or crack.

(d) It is difficult to apply coating by means of a coating pan for those seeds having a shape far from the spherical form.

(e) When a seed is sealed in coating, lack of oxygen may be caused.

(f) Since seeds of light weight can be scattered, the coating material will not be adhered thereto well by rolling (seed of light weight and minute size oscillate simply upon using vibration coating).

(g) There are soft coatings using such gel or gelatin-like material that swells when the seed contains water. However, there has not yet been known no coating the seed by using an aqueous gel that cures only at the surface layer.

OBJECT OF THE INVENTION

It is an object of the present invention to overcome the foregoing problems and provide a method capable of applying coating efficiently without damaging the seed and capable of optionally controlling the thickness of the coating layer or the size of bubbles in the inside depending on the size of the seed, as well as an apparatus used therefor.

Another object of the present invention is to provide a method of gel-coating a seed with a curable gel into a larger spherical form, immersing them into a curing agent for a predetermined period of time to cure the surface of the gel-coating and, subsequently, taking the gel-coated seed out of the curing agent, washing out the deposited curing agent with water and curing only the surface layer, as well as an apparatus used therefor.

SUMMARY OF THE INVENTION

The foregoing object can be attained in accordance with the present invention by a method of gel-coating a seed which comprises opening and closing a gel flow channel in a nozzle main body that contains a gel therewithin at a predetermined time interval by a cutting plunger, forming a gel-coating layer by opening a valve, supplying a predetermined number of seeds contained in a seed storing vessel to the gel-coating layer through the inside of the cutting plunger to apply gel-coating to the seed and falling the gel-coated seed into a curing vessel by closing the valve.

The gel-coated seed is cured by supplying the gel-coated seed gravitationally to the curing vessel by closing the valve in which a curing agent is caused to flow from an inlet to an exit, immersing the seed for a predetermined period of time in the curing agent and then washing it in a washing device.

The apparatus used for the method of gel-coating the seed includes a seed supply portion comprising a drum having a small aperture formed at a cylindrical circumferential wall for seed under vacuum and rotating in contact with seeds contained in a seed storing vessel, a negative pressure source in communication with the inside of said drum, and a closing member for interrupting the communication of the small aperture with the inside of the drum when the small aperture reaches a lower position, and a gel-coating portion having a cylindrical cutting plunger for opening and closing a gel flow channel disposed at the inside of a nozzle main body and means for supplying the gel into the gel flow channel adapted such that a gel coating film is formed below the seed supply portion upon opening of the valve by the cutting plunger and gel-coated seed is fallen by closing the valve.

The surface layer of the gel-coated seed may be cured by disposing a curing vessel below the gel-coating portion having a flow channel for flowing the curing agent from an inlet to an exit and having a seed receiving portion near the inlet, a conveyor for conveying the gel-coated seed discharged from the exit of the curing vessel and a washing portion having a washing nozzle for washing the gel-coated seed on the conveyor with water.

The curing vessel preferably comprises a dam formed at the inlet from which the curing agent may enter by overflow and a rectifying grid disposed to the down stream of the dam for properly immersing the seed for a predetermined period of immersion time. A flow control valve is disposed to the suction side pipeway for the curing agent and a level adjusting plate for the curing agent is disposed at the exit of the curing vessel for adjusting the immersion time.

In the seed supply portion, since the pressure at the inside of the drum is negative, external air is sucked through the small aperture and the seed in contact with the outer circumferential surface of the drum is attracted to the small aperture.

Since the closing member is in contact with the inner circumferential surface of the drum, when the small aperture is shielded by closure member, the small aperture loses its attraction force to let the seed fall gravitationally.

In the gel-coating portion, a curable gel is supplied by the operation of the cylinder to the gel flow channel by way of a gel-containing space, and the gel is caused to flow out at a predetermined amount when the valve seat is opened by the elevation of the cutting plunger and a gel layer is formed below the cutting plunger.

The seed fallen from the seed supply portion drops above the gel layer and, thereafter, the gel is further caused to flow thereover by the operation of the cylinder and, thus, the seed is coated by the gel layer that forms a space at the inside thereof.

The seed-coating gel falls gravitationally along with the closure of the valve seat by the lowering of the cutting plunger and is then sphericalized during its falling due to the surface tension.

The falling gel-coated seed falls into the seed receiving portion of the curing vessel, flows toward the exit together with the curing agent while being immersed in the agent, flows out from the exit after a predetermined period of immersion time and is then placed on a conveyor in the succeeding washing portion.

The gel-coated seed placed on the conveyor is washed by the washing nozzle and then sent to the discharge side of the conveyor.

DESCRIPTION OF THE ACCOMPANYING DRAWINGS

These and other objects, as well as features of the present invention will be explained more in details while referring to the appended drawings illustrating the preferred embodiments of the present invention, wherein:

FIG. 9 is a front elevational view of FIG. 8;

FIG. 12 is a side elevational view for a portion of the curing vessel; and

FIGS. 13 A–13 E are schematic views for explanating the process of the gel-coating.

DESCRIPTION OF THE PREFERRED EMBODIMENTS

Figure 1:
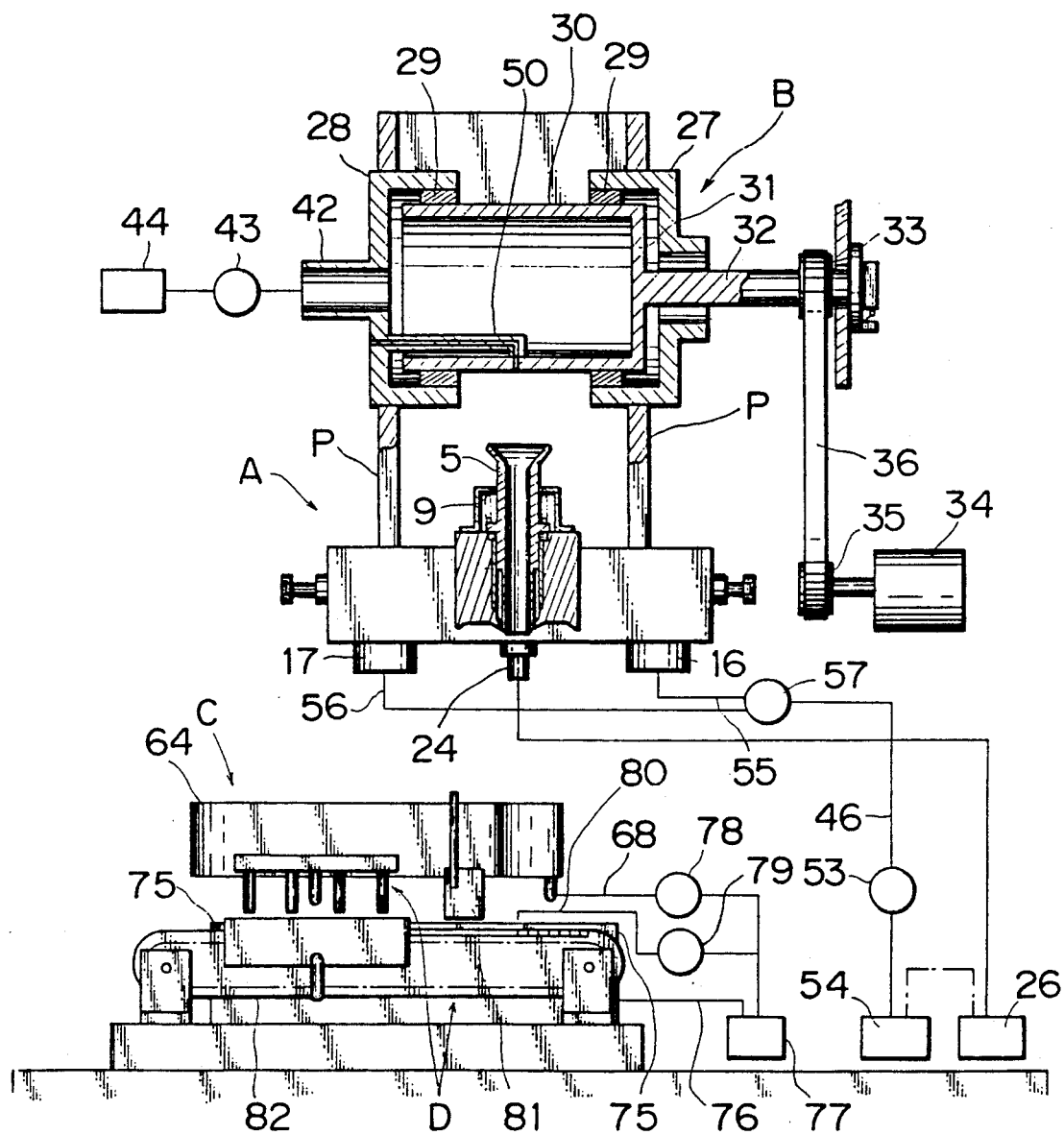
FIG. 1 is a front elevational view of an apparatus according to the present invention, in which a seed supply portion, a gel-coating portion, a curing vessel and a washing portion are partially cross-sectioned to show positional relationship with each other.

As shown in FIG. 1, the apparatus according to the present invention comprises a gel-coating portion A, a seed supply portion B disposed thereabove, a curing vessel C and a washing portion D disposed below the gel-coating portion A. The gel-coating portion A and the seed supply portion B are secured to two side walls P that stand on the casing of the apparatus.

Figure 2:
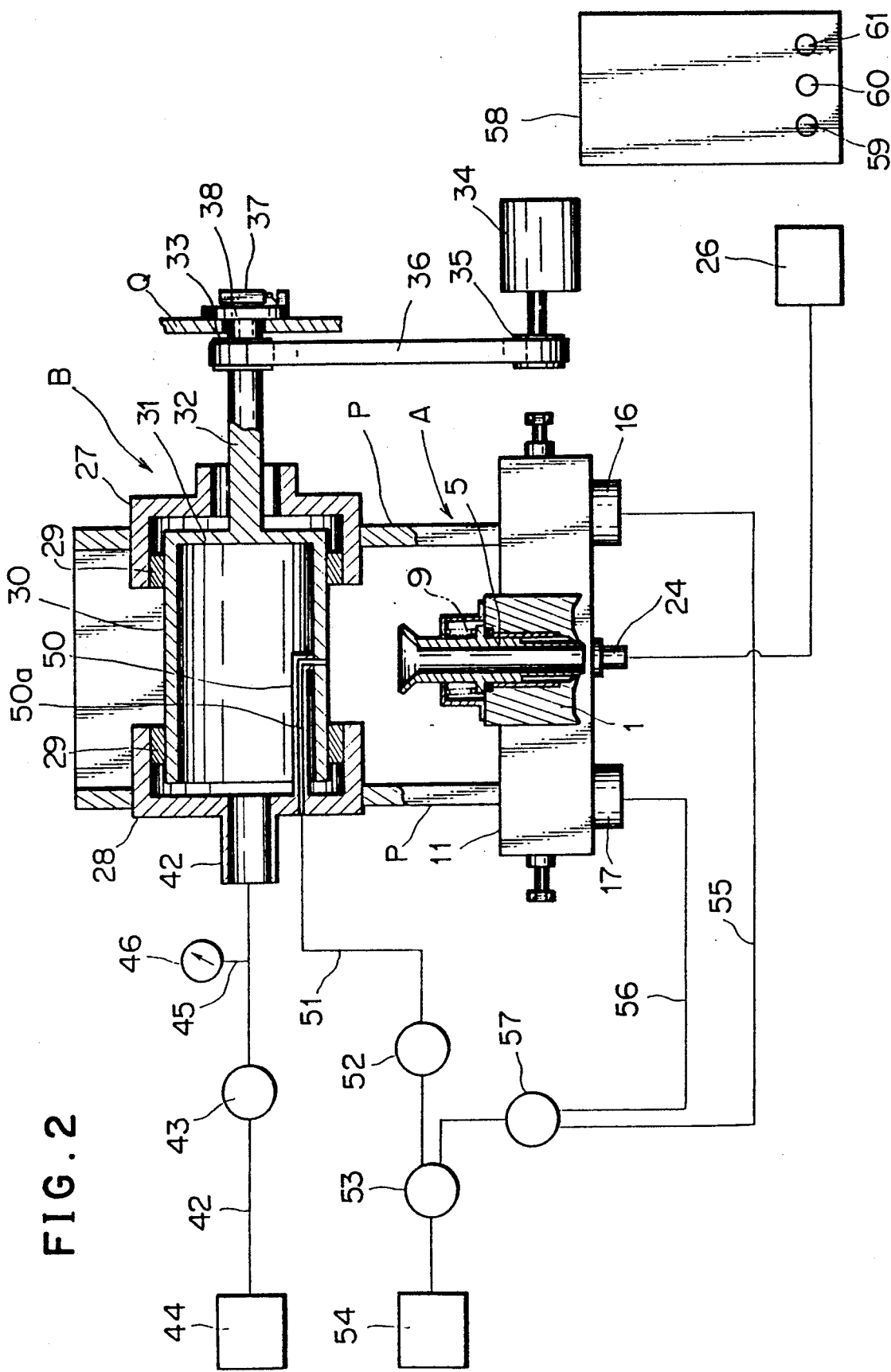
FIG. 2 is a system chart for pipeways between the seed supply portion and the gel-coating portion of the apparatus.
Figure 3:
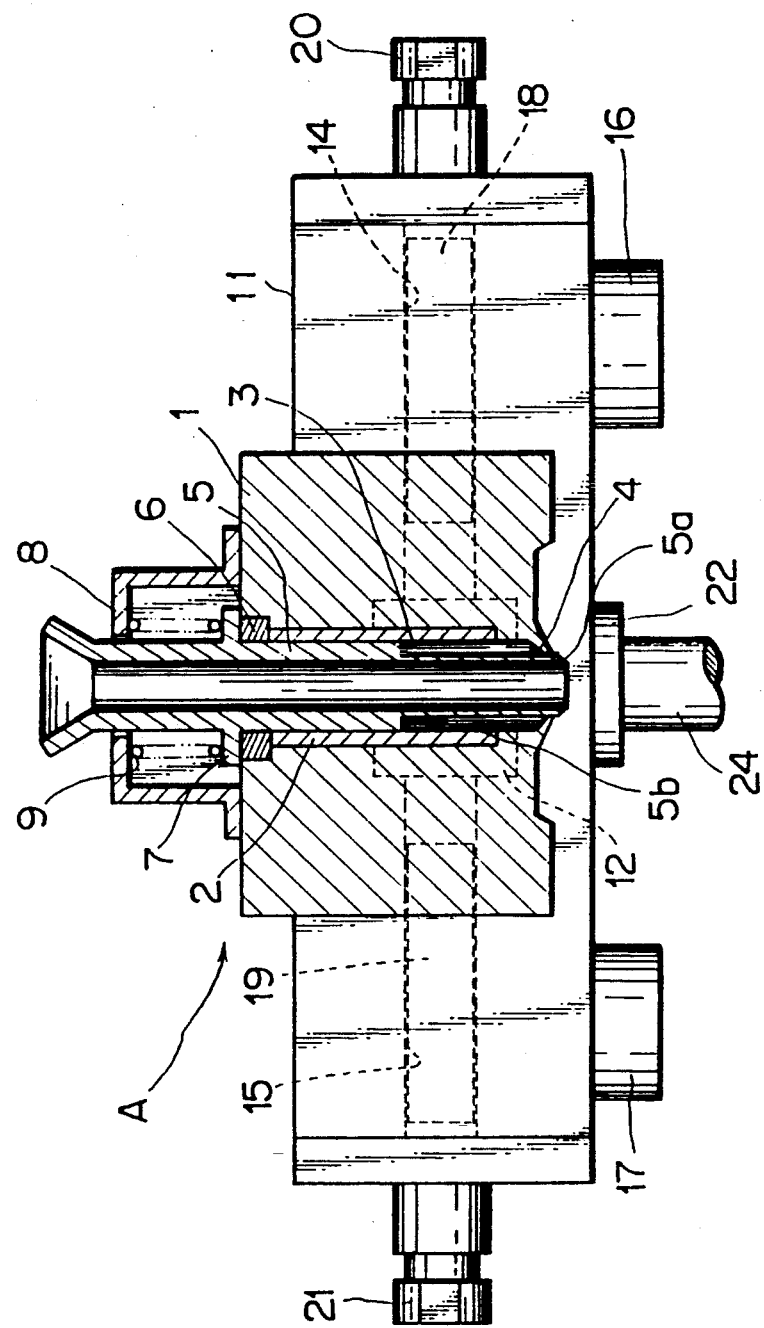
FIG. 3 is a front elevational view, partially in cross section of the gel-coating portion.
Figure 4:
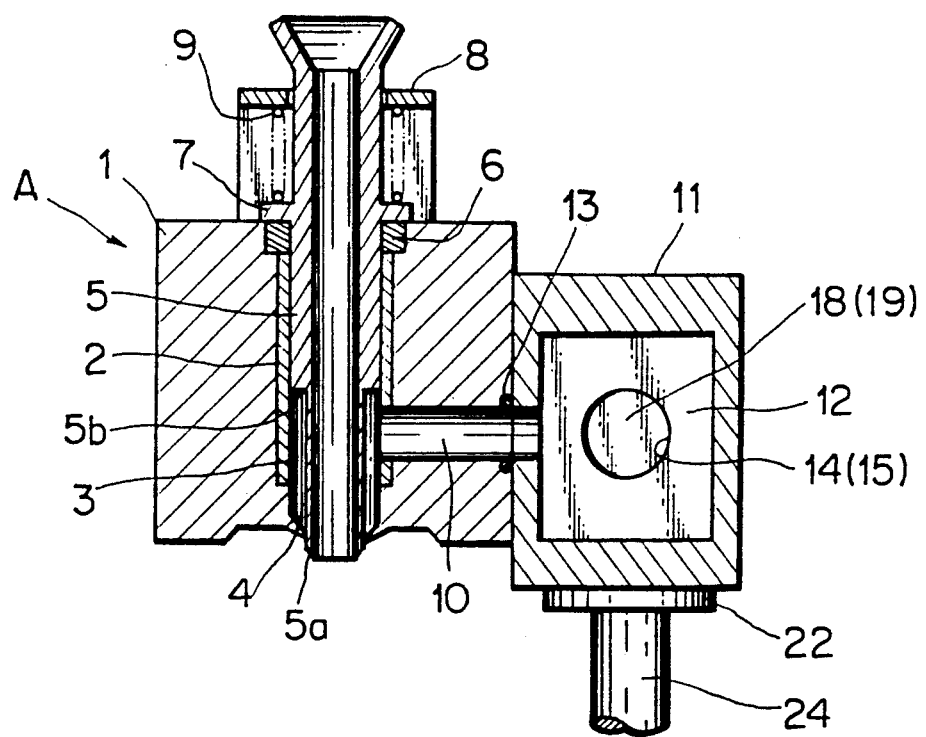
FIG. 4 is a vertical cross sectional view of FIG. 3.

As shown in FIGS. 2 through 4, the gel-coating portion A has a vertical through-hole at the center of a nozzle main body 1, through which a bush 2 is press-fixed and a plunger insertion hole 3 is formed to the inner face of the bush 2.

A tapered valve seat 4 the diameter of which is reduced downwardly is disposed below the plunger insertion hole 3 and a cylindrical cutting plunger 5 is fit to the inside of the plunger insertion hole 3 so that it can move upwardly and downwardly.

The gap formed between the cutting plunger 5 and the plunger insertion hole 3 is so small that a gel does not leak therethrough, but leakage of the gel can be prevented completely by forming a step at the upper end of the plunger insertion hole 3 and mounting a packing 6 to the step. A flange 7 is disposed along the outer circumference of the cutting plunger 5 and a spring 9 is inserted between a spring receiver 8 attached to the nozzle main body 1 and the flange 7.

Accordingly, the cutting plunger 5 is resiliently biased downwardly and the lower end of the cutting plunger 5 constitutes a valve 5a for closing the valve seat 4.

In addition, a presure receiving portion 5b is disposed along the outer circumference of the cutting plunger 5 so that, when the pressure in the plunger insertion hole 3 is increased, the cutting plunger 5 pressurized at the pressure receiving portion 5b moves upwardly against the spring 9, by which the valve 5a leaves the valve seat 4.

The plunger insertion hole 3 is in communication with a gel flow channel 10 leading to the side of the nozzle main body 1 and, the gel flow channel 10 is further in communication with a gel containing space 12 formed at the inside of a cylinder casing 11.

An O-ring 13 is mounted between the nozzle main body 1 and the cylinder casing 11.

In the gel containing space 12, cylinders 14 and 15 are in communication with each other, and pistons 18, 19 receiving air pressure by way of solenoid switch valves 16, 17 are slidably inserted to inside of the cylinders 14, 15.

Screws 20, 21 are disposed on both ends of the cylinder casing for adjusting the stroking amount of the pistons 18, 19.

The lower wall of the gel containing space 12 is formed with an aperture in communication with a gel supply pipe 24 by way of a lead valve 22, which permits the gel to flow only to the direction of the gel containing space 12. A gel storing vessel 26 is in communication with the gel supply pipe 24 (refer to FIG. 2).

As shown in FIG. 2, the seed supply portion B disposed above the gel-coating portion A is secured at its holders 27, 28 to the side walls P and a drum 30 is rotatably supported by way of sealing members 29 to the inner surface of the holders 27, 28.

The drum 30 is opened at one end and integrally secured at the other end with a shaft 32 that extends through the side wall 31. A belt 36 is laid around a pulley 33 mounted to the shaft 32 and a pulley 35 mounted to the power shaft of a geared motor 34.

Figure 5:
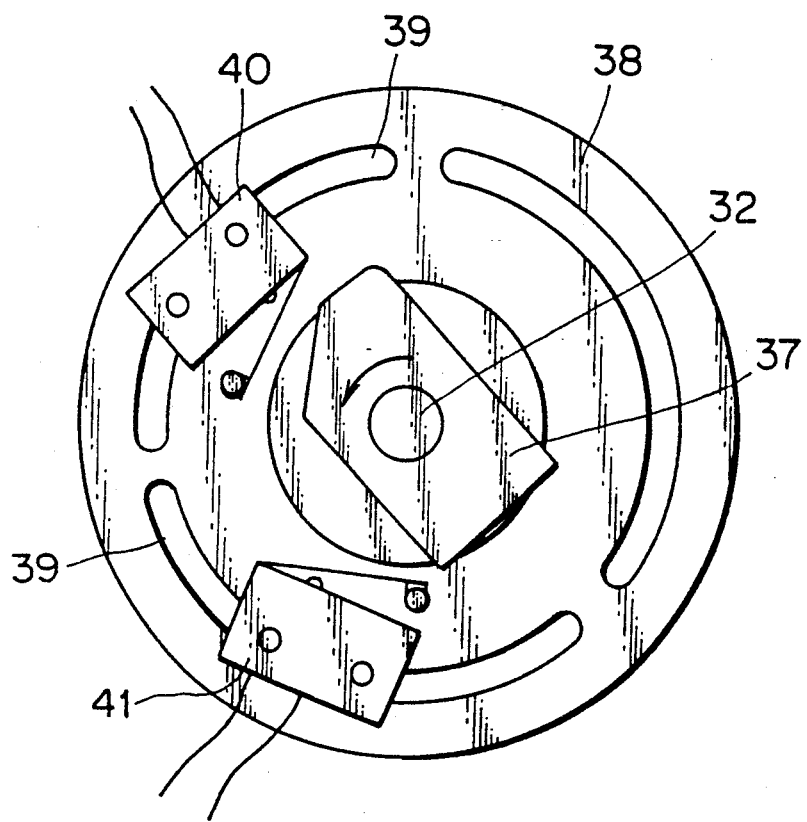
FIG. 5 is a side elevational view for a portion of a cam and the periphery thereof.

A cam 37 is fit to the end of the shaft 32, and limit switches 40, 41 attached adjustably to a groove 39 in a limit switch mounting plate 38 disposed to a side plate Q of the casing are brought closer to the periphery of the cam 8. The limit switches 40, 41 are actuated on every one rotation of the cam 37 (refer to FIG. 5).

The holder 28 has a pipeway 42, which is in communication by way of a regulator 43 to a suction pump 44.

A pressure gauge 46 indicating the pressure inside the drum 30 is attached to a branch pipe 45 from the pipeway 42.

Figure 6:
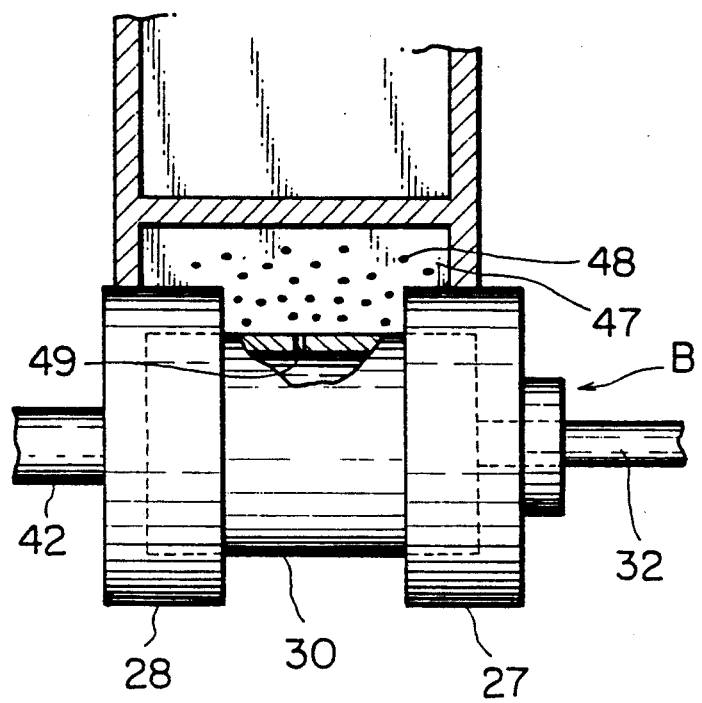
FIG. 6 is a plan view for the seed supply portion.
Figure 7:
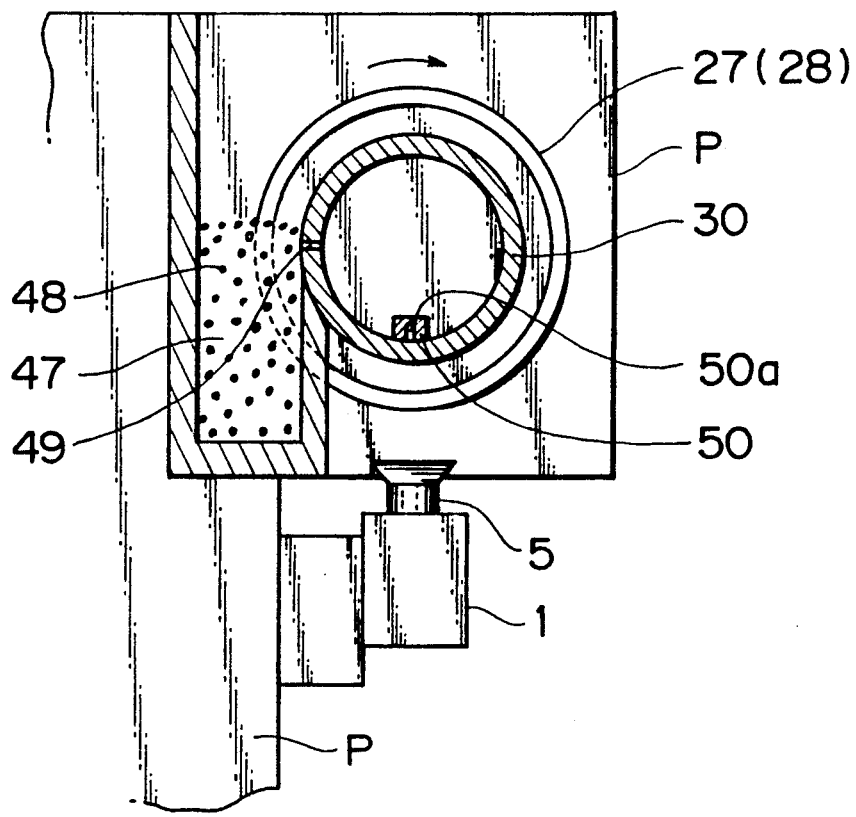
FIG. 7 is a longitudinal cross sectional view of FIG. 6.

As shown in FIGS. 6 and 7, a seed storing vessel 47 is disposed to the case behind the drum 30 and seeds 48 contained in the seed storing vessel 47 are brought into contact with the rotating drum 30. A small aperture 49 is perforated through the circumferential wall of the drum 30 and, when the pressure inside the drum 30 goes negative, the seed 48 is attracted to the small aperture 49. Since the size of the small aperture 49 is much smaller than the seed 48, only one seed is attracted to the drum.

A closure member 50 attached to the holder 28 is in contact at the end face thereof with the lowermost portion of the inner circumferential surface of the drum 30, so that the end face of the closing member 50 closes the small aperture 49 when the small aperture 49 reaches the lowermost portion of the drum 30 along with the rotation of the drum 30, by which the small aperture 49 loses its effect of attracting the seed 48 and the seed 48 falls from the drum 30 into the cylinder of the cutting plunger 5. In FIG. 2, for making the falling of the seed 48 more reliable, an aperture 50a is formed to the inside of the closing member 50 which is in communication with a pipeway 51 through which pressurized air flows, so that the small aperture 49 is aligned with the aperture 50a when the aperture 49 reaches the lowermost end by which the pressurized air flows into the small aperture 49 to blown off the seed 48 downwardly.

The pipeway 51 is connected by way of a speed controller 52 and a pressure releasing valve 53 to a compressor 54. Further, pipeways 55, 56 in communication with the solenoid switch valves 16, 17 respectively are connected by way of a speed controller 57 to the compressor 54.

Three switches 59, 60 and 61 are disposed on a switch board 58, in which the switch 59 is a main switch for the ON-OFF of all power sources, the switch 60 is a power source switch for the geared motor 34 and the switch 61 is a power source switch for the suction pump 44.

Below the gel-coating portion B, the curing vessel C and the washing portion D are disposed.

Figure 8:
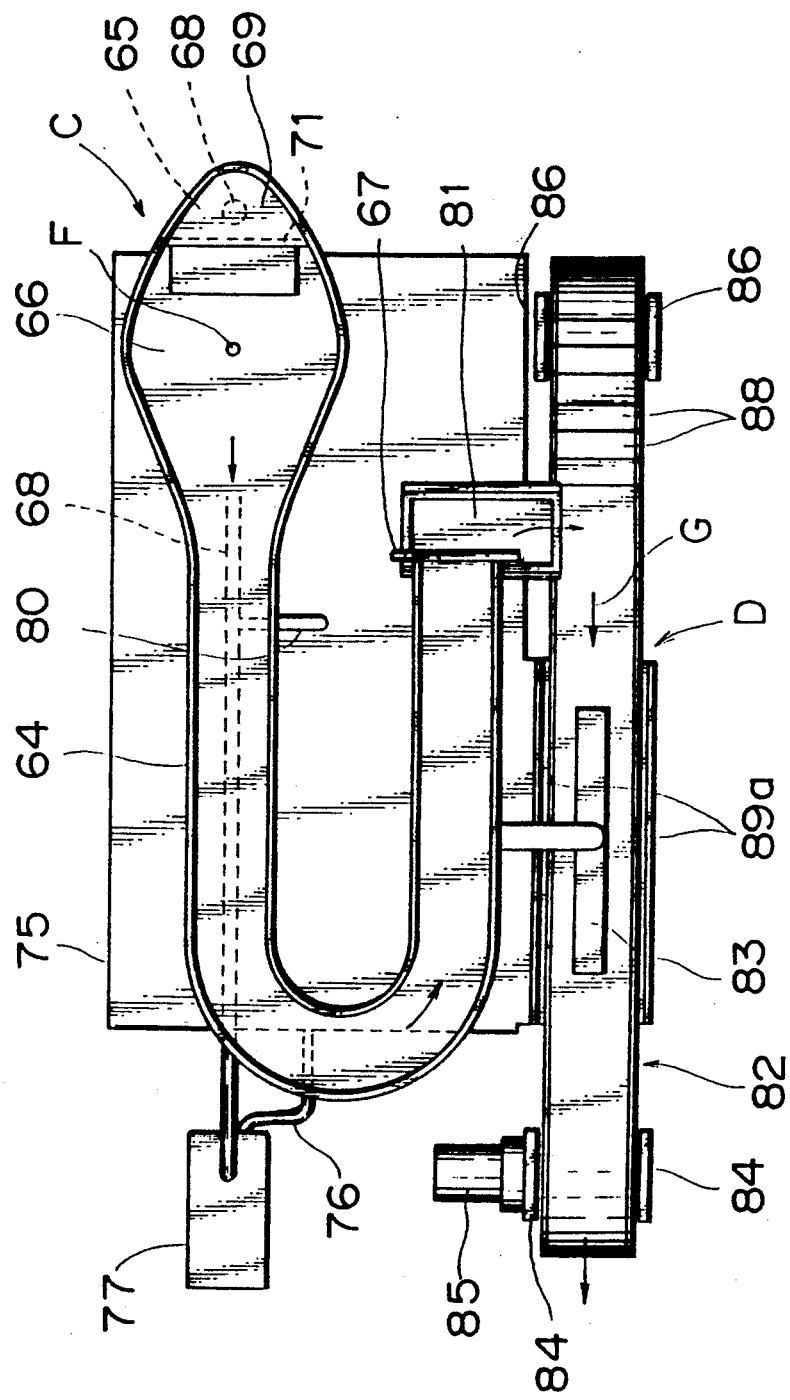
FIG. 8 is a plan view for the curing vessel and the washing portion.

As shown in the plan view of FIG. 8 and the front elevational view of FIG. 9, the curing vessel C has a main vessel 64 opened at the upper portion and having a U-shaped flow channel. A curing agent receiving portion 65 is disposed at the inlet of the vessel 64, a seed receiving portion 66 of a large width is disposed to the downstream of the curing agent receiving portion 65 and an exit flange 67 having an opening at the control portion is disposed at the end on the side of the exit.

A dam 71 is disposed to the curing agent receiving portion 65 for defining an opening 70 between the bottom wall in communication with a curing agent pipeway 68 and an upper wall 69 that stands an the bottom wall (refer to FIG. 8).

The curing agent supplied from the curing agent pipeway 68 overflows from the upper edge of the dam 71 and falls along the dam 71, so that the flow rate of the curing agent is made substantially equal over the lateral direction of the dam 71.

Figure 10:
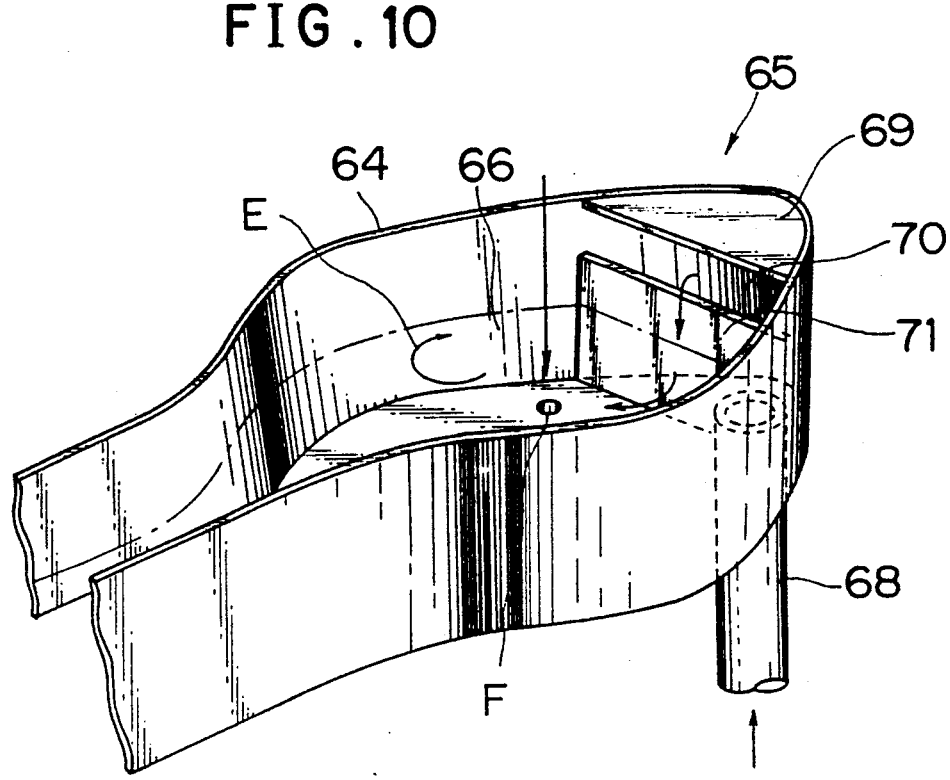
FIGS. 10 and 11 are perspective views for a portion of a curing vessel.
Figure 11:
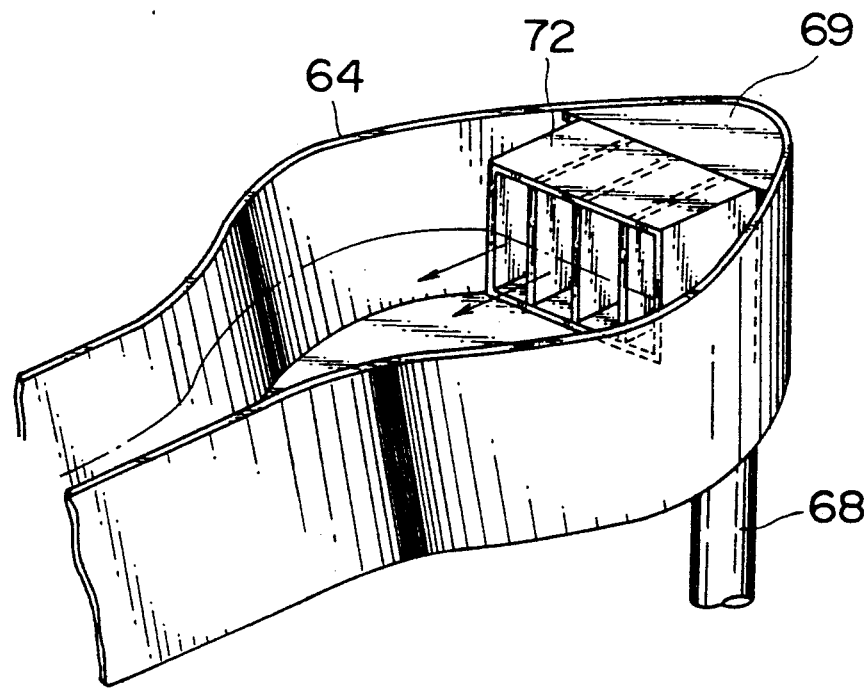

However, the curing agent tends to cause swirling stream in the seed receiving portion 66 of large width as shown by arrow in FIG. 10 and fallen gel-coated seed F is involved into the swirling stream and abutted against the inner wall of the vessel 64 to possibly suffer from deformation at the spherical gel surface. Accordingly, as shown in FIG. 9, a rectifying lattice 72 is disposed downstream of the dam 71 for rectifying the stream of the curing agent to prevent the occurrence of the swirling stream.

FIG. 12 is a side elevational view for a portion illustrating the exit end of the vessel 64, in which a level adjust plate 74 is attached at a lower portion of an opening 73 for discharging the curing agent formed at the control portion of the exit flange 67.

The height H from the bottom wall of the vessel 64 to the upper edge of the level adjust plate 74 defines the level of the curing agent in the vessel 64.

A tank 75 for storing the curing agent is disposed below the vessel 64, and the curing agent in the tank 75 is supplied from a suction side pipe 76 by way of a recyling pump 77 and through a flow rate control valve 78 to the curing agent pipe 68, or through the valve 79 to a return pipe 80 (refer to FIG. 1).

Accordingly, it is possible to control the immersion time of the gel-coated seed and control the curing depth at the surface layer of the coating gel by controlling the flow rate of the curing agent by the valve 79 and adjusting the level adjust plate 74, thereby controlling the cross sectional area of the flow channel.

An inclined shute 81 having a meshed bottom and lowered outwardly is disposed below the exit flange 67 and a conveyor 82 in the washing portion D is disposed below the exit of the inclined shute 81.

The washing portion D comprises a conveyor 82 rotating in the direction of an arrow G in FIG. 8 and a washing nozzle 83 disposed above the conveyor. In the conveyor 82, a power shaft of a geared motor 85 of barriable speed is coupled to the shaft supported by bearing 84, while a driving sprocket secured to the shaft rotates an endless chain 87 laid around a driven sprocket and the driving sprocket. A plurality of slats 88 each having vertical walls on both ends of a flat plate are arranged and secured to the endless chain 87 to constitute so-called slat conveyor.

A washing nozzle 83 having four nozzles 83a jetting out water toward the conveyor 82 is disposed above the conveyor 82 near the exit thereof.

The washing time for the gel-coating seed can be controlled by adjusting the speed of the conveyor 82.

Reference numeral 89 denotes a water recovery device having a shielding cover 89a for preventing water jetted out from the washing nozzle 83 from scattering around.

The viscous gel fluid and the curing agent used for the gel-coating of seed in the present invention are prepared, for example, as disclosed in japanese Patent Laid-Open Sho 63-68008.

That is, a viscous gel fluid is prepared by adding nutrients and desired chemicals such as sterilizer in the form of an aqueous solution to an aqueous gelifying agent, dissolving them to purified water such that the concentration of the gelifying agent is from 2 to 4% by weight, allowing to stand for 1 to 2 hours to be swollen sufficiently by absorption of water and then applying stirring. There is no particular restriction for the aqueous gelifying agent so long as it has such a property and alkali salts of natural gel, synthetic organic gel or inorganic gel may be used. Preferred gelifying agents are, for example, sodium alginate and sodium polyacrylate. They are harmful neither to plant bodies nor to human beings and can be used safely.

The thus obtained seed-dressing spherical gel body is immersed in an aqueous solution of bivalent or trivalent metal salt. As the aqueous solution of metal salt usable herein there can be mentioned an aqueous solution of chloride of bivalent metals such as Ca, Mg and Ba, or an aqueous solution of Al chloride. The concentration of the aqueous solution of the metal salt is adjusted to about 50% by weight.

The spherical gel, when immersed in the aqueous solution of the metal salt causes substituting reaction between the alkali metal of the aqueous gelifying agent therein (for example, Na) and bivalent or trivalent metal (for example, Ca), thereby causing chemical change to the surface of water insoluble material having extremely fine pores in optical point of view.

Gel-coating operation for seeds by the apparatus according to the present invention having thus been constituted is to be explained.

When the switch 59 is turned ON, the compressor 54 is started and pressurized air is adjusted to 4–5 kg/cm$^2$ by way of the pressure-reducing valve 58.

When the switch 60 is turned ON, the geared motor 34 start its rotation and rotates the shaft 32 by way of the belt 36. Then, the cam 37 disposed at the end of the shaft 32 rotates counterclockwise in FIG. 5 and hits the limit switches 40 and 41 once per one rotation of the shaft 32. When the limit switch 40 is hit, the solenoid switch valve 16 is actuated, by which the pressurized air in the pipeway 55 urges the piston 18. The piston 18 moves toward the gel containing space 12 at the central portion of the cylinder case 11 to forces the gel in the gel containing space 12 to flow into the gel flow channel 10 (refer to FIGS. 3 and 4).

Figure 13A:
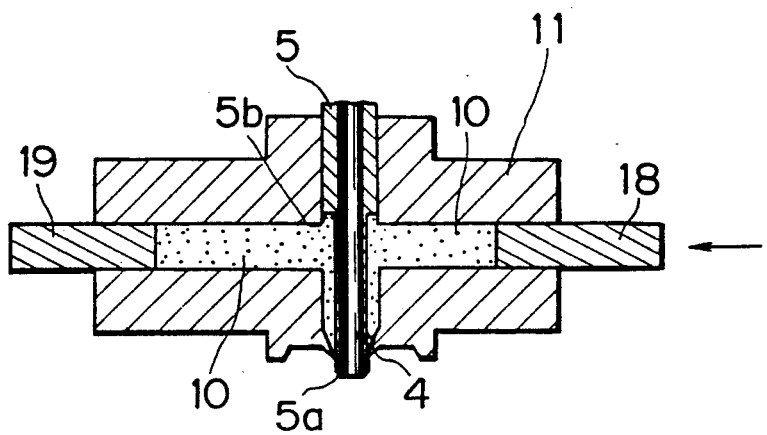
Figure 13B:
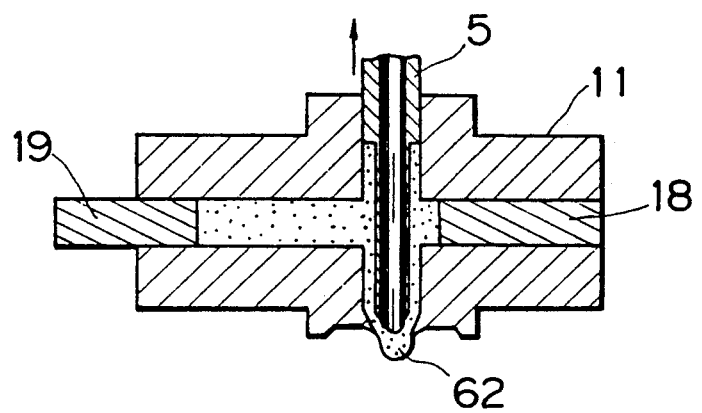
Figure 13C:
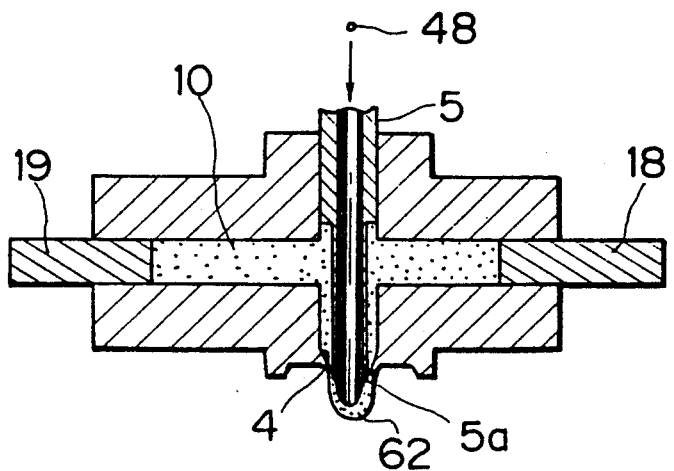
Figure 13D:
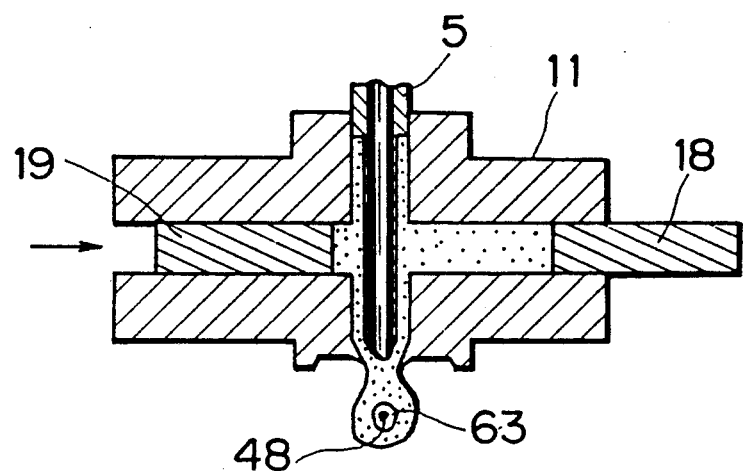
Figure 13E:
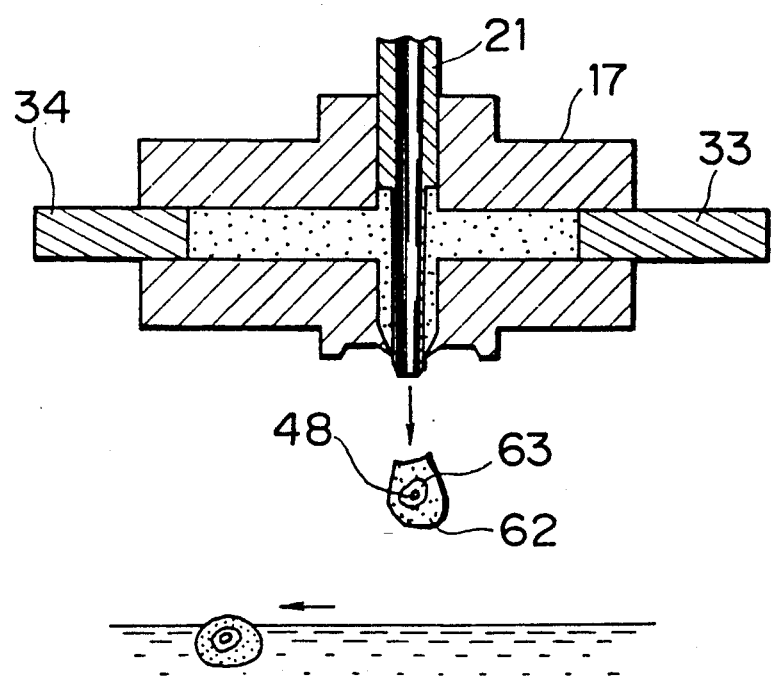

The operational procedures are schematically shown as in FIG. 13A, in which a curable gel urged into the gel flow channel 10 presses the pressure receiving portion 5b of the cutting plunger 5, by which the cutting plunger 5 moves upwardly against the spring 9 and the valve 5a at the lower end of the cutting plunger 5 leaves the valve seat 4 to open the valve. Then, the curable gel is discharged along the tapered surface of the valve seat 4 to form a gel layer 62 (refer to FIG. 13 B).

When the piston 18 reaches the rightward moving end, the solenoid switch valve 16 is actuated by a timer or means for detecting the rightward moving end, etc. and the piston 18 moves leftwardly to return to the leftward end. Simultaneously, the pressure in the gel containing space 12 goes negative to open the lead valve 22 and the gel is supplied from the supply pipe 24 to the gel containing space 12. Then, the cutting plunger 5 returns downwardly by the urging force of the spring 9 to close the valve. However, the gel layer 62 does not fall by its adhesion.

Then, the seed 48 falls from the seed supply portion B above, passes through the cylinder of the cutting plunger 5 and falls on the gel layer 62 (refer to FIG. 13 C).

Then, operation of the seed supply portion B till the seed 48 is supplied by falling is explained. The shaft 32 is fallen and rotated the switch 60 to ON, while the suction pump 44 is actuated by turning the switch 61 to ON, thereby reducing the pressure inside the drum 30 by way of the pipeway 42.

The suction force in the pipe 42 can be adjusted by the regulartor 43 and the suction pressure is indicated on the pressure gage 46.

The drum 30 is rotated together with the shaft 32 and is in sliding contact with the seeds 48 in the seed storing vessel 47, in which a seed 48 is sucked to the small aperture 49 formed in the drum 30.

Since the size of the small aperture 49 is much smaller, only one seed 48 is sucked and it rotates while being adsorbed on the drum 30 that rotates clockwise in FIG. 7. When the small aperture 49 situates at the lowermost position, the small aperture 49 is closed by the closing member 50 to lose its seed attraction force and the seed 48 falls downwardly.

In this case, when the aperture 50a disposed to the inside of the closing member 50 is in communication by way of the pipeway 51 and the compressor 54, the pressure at the small aperture 49 changes from negative to positive pressure when the small aperture 49 is aligned with the aperture 50b, to surely blown out the seed 48 just below.

After falling of the seed 48 on the gel layer 62, the cam 37 hits the limit switch 41 to actuate the solenoid switch valve 17. Then, the piston 19 moves rightwardly to open the valve again to discharge the gel (refer to FIG. 13 D).

Thus, the gel coats the seed 48 together with a bubble 63, droops by its own weight and is then gradually sphericalized by the surface tension.

Then, the solenoid switch valve 17 is actuated to return the piston 18 to the leftmost end and, since the pressure inside the gel containing space 12 goes negative, the lead valve 23 is opened to supply the gel from the gel supply pipe 25 to the gel containing space 12. In addition, since the cutting plunger 5 returned downwardly by the pressing force of the spring 9 to close the valve seat 4, the gel layer that can no more sustain its own weight drips gravitationally, is then supplied to the seed receiving portion 66 of the vessel 64 in the curing vessel C while gradually sphericalized due to the surface tension during falling and reaches together with the curing agent flowing through the vessel 64 to the exit flange 68 (refer to FIG. 13 E).

Since the gel-coated seed is immersed for a predetermined period of time in the curing agent and then discharged on the conveyor 82, seed-coating is applied being cured to a predetermined thickness only at the surface layer.

Next, the gel-coated seed is washed with water jetted out from the washing nozzle on the conveyor 82 and then discharged from the conveying end of the conveyor 82.

Thus, one cycle of the seed coating has thus been completed on every one rotation of the shaft 32 and seed-coating can be conducted effectively and successively along with the continuous rotation of the shaft 32.

The gel discharging amount can be controlled optionally by adjusting the stroking amount of the pistons 18, 19 by means of screws 20, 21, and the volume of the bubble 63 sealed together with the seed 48 in the gel layer can be controlled by controlling the speed controller 57 to thereby control the operation speed of the pistons 18, 19.

Depending on the kind of seeds, a plurality of seeds are sealed in one gel layer and, in such a case, a plurality of small apertures may be formed to the drum so that a plurality of seeds are fallen and supplied.

(1) All of the procedures for gel-coating of seed, curing at the surface of the coating layer and water washing are conducted continuously, automatically and at high efficiency to enable mass production of gel-coated seeds of stable quality at a low cost.

(2) Since the gel-coated seed is larger in the diameter and spherical in the shape and only the surface of the gel coating layer is cured to a predetermined depth, it is possible to obtain coated seeds easy for seeding and at high germination ratio. In addition, since seeds or the surface of the gel coating layer suffers from no external force during production step, there is no worry that the seed is damaged or the surface of the gel-coating layer is deformed or damaged.

(3) Since the period of immersing the gel-coated seed in the curing agent can be controlled by controlling the amount of the curing agent supplied to the curing vessel and by the adjustment of the level adjust plate at the exit of the curing vessel, the extent of curing at the surface layer of the gel-coated seed can be controlled optimally.

In addition, the washing time after curing the gel-coating can also be controlled to an optimum period by controlling the speed of the conveyor.

(4) The thickness of the gel-coating layer can be controlled optimally and easily depending on the size of the seed to be dressed.

(5) Since the size of a bubble sealed in the coating layer can optionally be varied depending on the oxygen demand of the seed, various kinds of seeds can be coated.

(6) The number of seeds to be dressed can be optionally changed from one to five or so.

(7) The apparatus of the present invention is light in the weight, small in the size and simple in the structure, as well as after treatment such as washing can be applied easily after the completion of the coating.

What is claimed is:

1. A method of gel-coating a seed, which comprises the steps of:

providing a supply of seeds in a seed storage vessel;
providing a curable gel;
providing a curing vessel for curing said gel;
delivering said gel to a chamber having an outlet at a bottom end of said chamber and a hollow plunger movable to close and open said outlet;
moving said plunger to open said outlet and form a gel-coating layer at said outlet;
delivering at least one seed from said storage vessel through said hollow plunger to said gel-coating layer, and
moving said plunger to close said outlet, sever said gel-coating layer and permit said at least one seed with said gel-coating layer to fall into said curing vessel.

2. The method of gel-coating a seed as defined by claim 1, and further including the steps of:

providing a gas pressure in said hollow plunger when said seed is delivered; and
enclosing said at least one seed in a bubble of said gas in said gel-coating layer.

3. A method of gel-coating a seed, which comprises the steps of:

providing a supply of seeds in a seed storage vessel;
providing a curable gel;
providing a curing vessel having a channel in which a gel curing agent flows from an inlet to an outlet and means for controlling the flow of said curing agent in said channel;
providing a nozzle having an internal flow channel, a flow channel outlet open at a bottom end of said nozzle, and a hollow plunger movable to close and open said outlet;
delivering said gel to said flow channel;
moving said plunger to open said outlet and form a gel-coating layer at said outlet;
delivering at least one seed from said storage vessel through said hollow plunger to said gel-coating layer,
moving said plunger to close said outlet, sever said gel-coating layer and permit said at least one seed with said gel-coating layer to fall into said curing agent in said curing vessel;
controlling the curing time of said at least one seed and gel-coating layer in said curing agent by controlling the flow of said curing agent from said inlet to said outlet;
recovering said at least one seed and gel-coating layer from said curing vessel at said outlet; and
washing said at least one seed and gel-coating layer.

4. The method of gel-coating a seed as defined by claim 3, and further including the steps of:

providing a gas pressure in said hollow plunger when said seed is delivered; and
enclosing said at least one seed in a bubble of said gas in said gel-coating layer.

* * * * *